United States Patent
Wu (10) Patent No.: US 10,682,813 B2
(45) Date of Patent: Jun. 16, 2020

(54) THREE-DIMENSIONAL FORMATION PLATFORM

(71) Applicants: XYZPRINTING, INC., New Taipei (TW); KINPO ELECTRONICS, INC., New Taipei (TW)

(72) Inventor: Chi-Chieh Wu, New Taipei (TW)

(73) Assignees: XYZPRINTING, INC., New Taipei (TW); KINPO ELECTRONICS, INC., New Taipei (TW)

(*) Notice: Subject to any disclaimer, the term of this patent is extended or adjusted under 35 U.S.C. 154(b) by 513 days.

(21) Appl. No.: 15/725,251

(22) Filed: Oct. 4, 2017

(65) Prior Publication Data
US 2019/0061244 A1 Feb. 28, 2019

(30) Foreign Application Priority Data
Aug. 23, 2017 (CN) .......................... 2017 1 0729317

(51) Int. Cl.
*B29C 64/245* (2017.01)
*B33Y 30/00* (2015.01)

(52) U.S. Cl.
CPC ............ *B29C 64/245* (2017.08); *B33Y 30/00* (2014.12)

(58) Field of Classification Search
CPC ............................. B29C 64/245; B33Y 30/00
See application file for complete search history.

(56) References Cited

U.S. PATENT DOCUMENTS

| 5,961,107 A * | 10/1999 | Morghen ................. B23Q 3/18 269/100 |
| 9,205,690 B2 * | 12/2015 | Leavitt ................... B33Y 40/00 |
| 2005/0173855 A1 * | 8/2005 | Dunn ...................... B29C 64/40 269/291 |

* cited by examiner

*Primary Examiner* — Joseph S Del Sole
*Assistant Examiner* — John Robitaille
(74) *Attorney, Agent, or Firm* — Chun-Ming Shih; HDLS IPR Services (57) ABSTRACT

A three-dimensional formation platform includes: a base (100), formed with a pair of guide slots (110); a carrier (200), stacked on the base (100) and clamped between the pair of guide slots (110); an elastic stopping unit (300) and an elastic pushing unit (400), disposed at two ends of the pair of guide slots (110) and abutted against the carrier (200). The elastic stopping unit (300) can be compressed for releasing the carrier (200), the elastic pushing unit (400) can provide an elastic force towards the elastic stopping unit (300), so that the carrier (200) can be displaced in a direction opposite to an installing direction (IN) for being released from the guide slot (110), a flange (210) corresponding to the guide slot (110) is extended from a portion defined at a lateral edge (203/204) of the carrier (200), and the flange (210) is received in the guide slot (110).

12 Claims, 8 Drawing Sheets

THREE-DIMENSIONAL FORMATION PLATFORM

BACKGROUND OF THE INVENTION

Field of the Invention

The present invention relates to a three-dimensional printer, especially to a three-dimensional formation platform having an advantage of being easily assembled.

Description of Related Art

The fused deposition modeling (FDM) technique is one of the formation means for three-dimensional printing, the formation means of FDM is to heat a filiform thermo melting material for being melted, meanwhile a formation ejecting nozzle is served to selectively coat the material on a working platform with respect to the cross-section contour of a preset picture file, so that a layer of cross section can be formed after the material is cooled and solidified. After the layer is formed, the working platform is descended by a level (in other words the thickness of each layer) then a next layer is formed until the whole three-dimensional product is established. The three-dimensional product is adhered on the working platform, and the formation ejecting nozzle is disposed above the working platform, thus the finished product is difficult to be taken out.

Accordingly, the applicant of the present invention has devoted himself for improving the mentioned disadvantages.

SUMMARY OF THE INVENTION

The present invention is to provide a three-dimensional formation platform having an advantage of being easily assembled.

Accordingly, the present invention provides a three-dimensional formation platform, which comprises a base, a carrier, an elastic stopping unit and an elastic pushing unit. The base is formed with a pair of guide slots arranged in parallel and oppositely disposed. The carrier is stacked on the base, clamped between the pair of guide slots and installed on the base along an installing direction parallel to the guide slot. The elastic stopping unit and the elastic pushing unit are correspondingly disposed at two ends of the guide slot and abutted against the carrier, thereby enabling the carrier to be clamped and fastened in the pair of guide slots, and the installing direction is defined as from the elastic stopping unit towards the elastic pushing unit. The elastic stopping unit is able to be compressed for releasing the carrier. The elastic pushing unit is able to provide an elastic force towards the elastic stopping unit, so that the carrier can be displaced in a direction opposite to the installing direction for being released from the guide slot. A flange corresponding to the guide slot is extended from a portion defined at a lateral edge of the carrier, and the flange is received in the corresponding guide slot. One end of the guide slot corresponding to the elastic stopping unit is defined as an inlet end, and one end of the flange is defined as an entry end, when the flange is about to be received in the corresponding guide slot, the entry end is allowed to firstly pass the corresponding inlet end. When the carrier is clamped between the elastic stopping unit and the elastic pushing unit, a distance defined between the entry end and the corresponding inlet end is smaller than a distance defined between the elastic stopping unit and the elastic pushing unit along the installing direction, so that the carrier is able to be disposed on or removed from the base along a forward direction of the carrier.

According to the three-dimensional formation platform provided by the present invention, the distance defined between the entry end and the corresponding inlet end is smaller than half of the distance defined between the elastic stopping unit and the elastic pushing unit along the installing direction.

According to the three-dimensional formation platform provided by the present invention, the base is further formed with a secondary guide slot corresponding to at least one of the guide slots and allowing the carrier to be received, the secondary guide slot is arranged between the elastic stopping unit and the corresponding guide slot and the secondary guide slot is longitudinally aligned with the corresponding guide slot. A secondary flange is extended from a portion defined at the lateral edge of the carrier corresponding to the secondary guide slot, and the secondary flange is received in the corresponding secondary guide slot. One end of the secondary guide slot corresponding to the elastic stopping unit is defined as a secondary inlet end, one end of the secondary flange is defined as a secondary entry end, when the secondary flange is about to be received in the corresponding secondary guide slot, the secondary entry end is allowed to firstly pass the secondary inlet end. When the carrier is clamped between the elastic stopping unit and the elastic pushing unit, a distance defined between the secondary entry end and the corresponding secondary inlet end is smaller than the distance defined between the entry end and the inlet end, so that the secondary flange is allowed to be firstly released from the corresponding secondary guide slot and then the flange is released from the corresponding guide slot.

According to the three-dimensional formation platform provided by the present invention, an elastic sheet can be adopted as the elastic stopping unit, and the compressing direction of the elastic stopping unit is arranged to be vertical to the carrier. The elastic stopping unit includes a seat part, a stopping block moveably disposed on the seat part, and an elastic member connected between the seat part and the stopping block. The compressing direction of the elastic member is arranged to be vertical to the carrier. The elastic member is a columnar spring or an elastic sheet.

According to the three-dimensional formation platform provided by the present invention, the elastic pushing unit is a columnar spring or an elastic sheet, and the compressing direction of the elastic pushing unit is arranged to be parallel to the pair of guide slots. The elastic pushing unit includes a seat part, a pushing block moveably disposed on the seat part, and an elastic member connected between the seat part and the pushing block. The compressing direction of the elastic member is arranged to be parallel to the pair of guide slots. The elastic member is a columnar spring or an elastic sheet.

With the carrier, the elastic stopping unit, the elastic pushing unit and the guide slots working with each other, the three-dimensional printer of the present invention is provided with an effect of being easily to be assembled/disassembled.

DETAILED DESCRIPTION OF THE INVENTION

A preferred embodiment of the present invention will be described with reference to the drawings.

Figure 1:
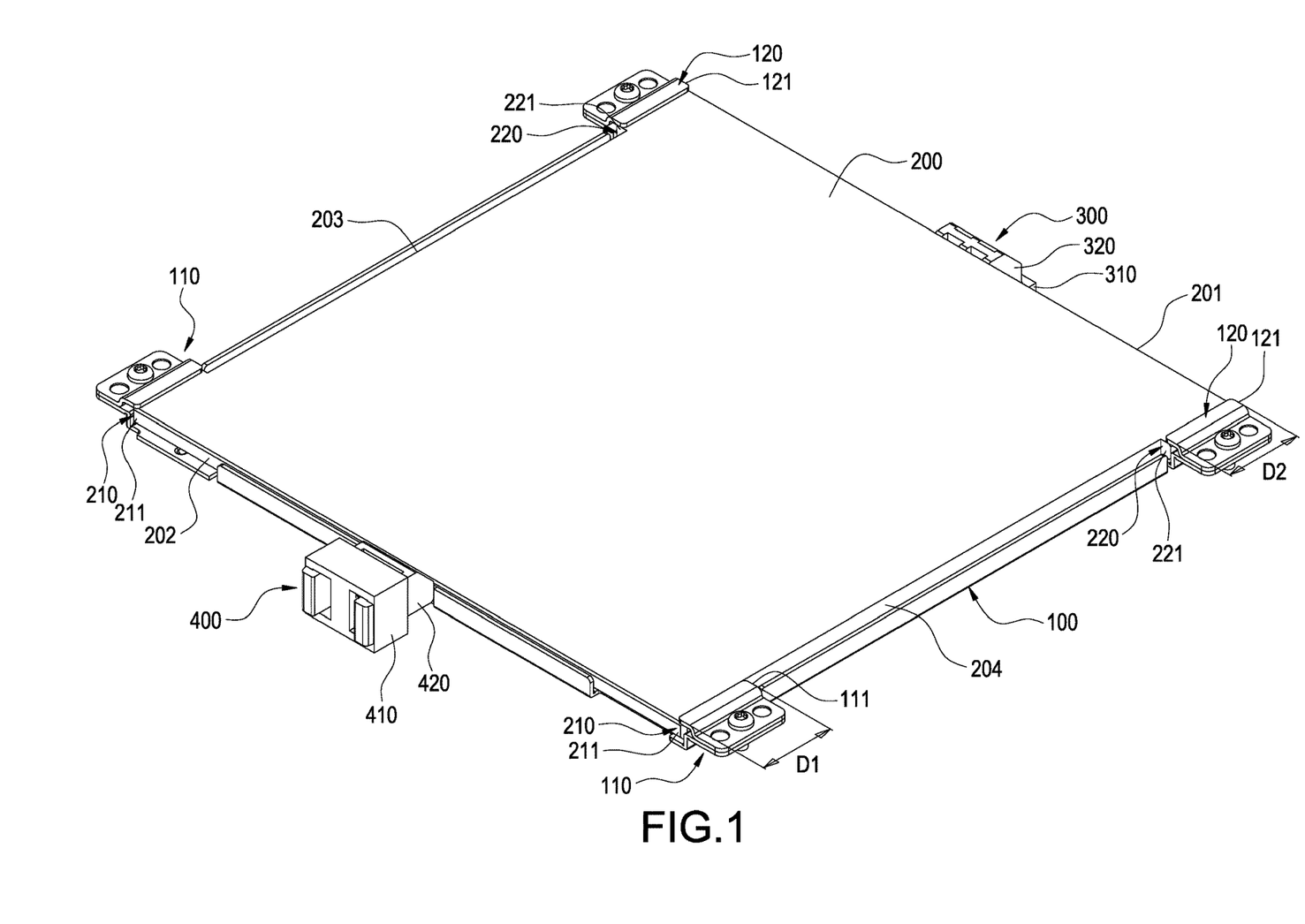
FIG. 1 is a perspective view showing a three-dimensional formation platform according to a preferred embodiment of the present invention.
Figure 2:
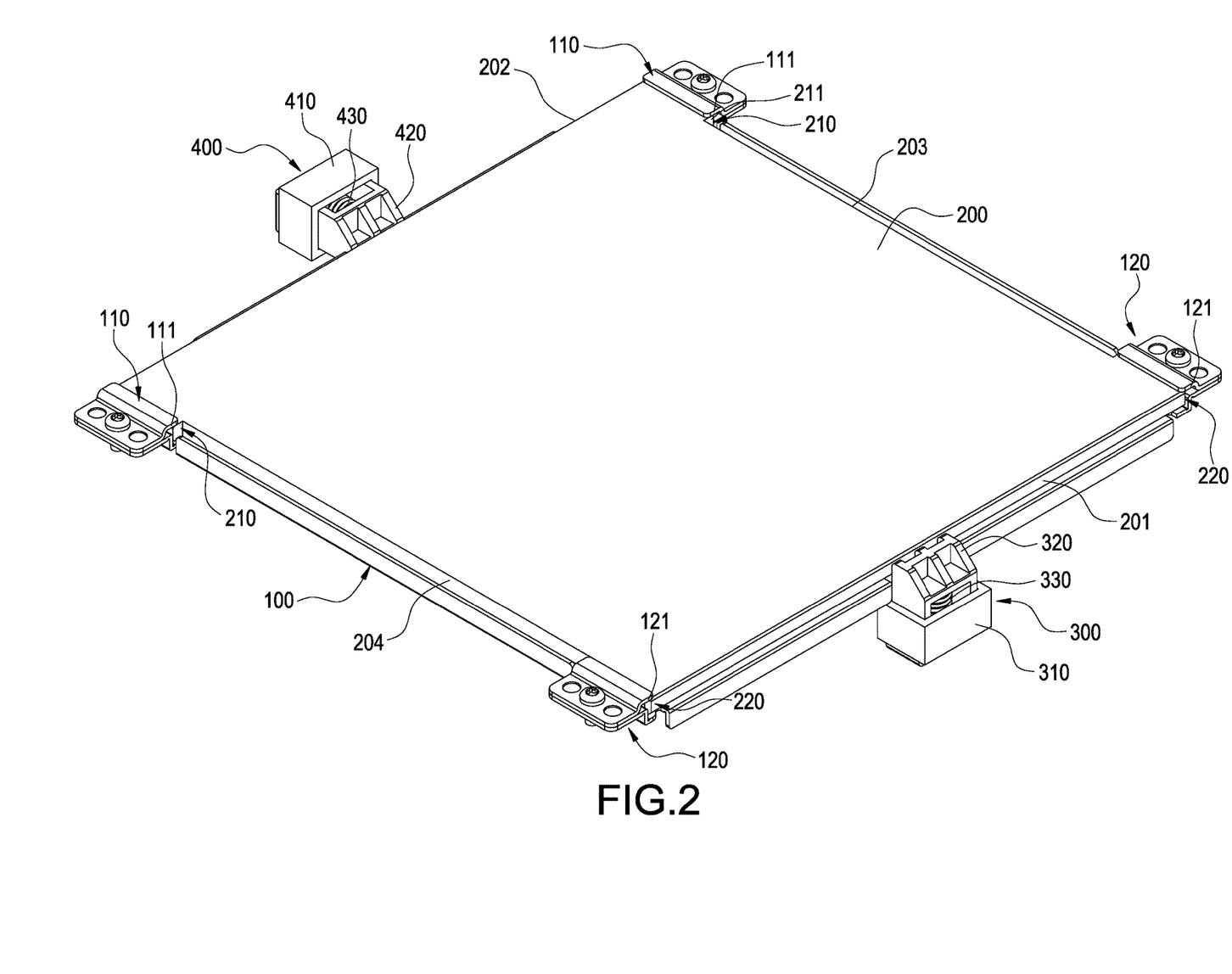
FIG. 2 is another perspective view showing the three-dimensional formation platform according to a preferred embodiment of the present invention.
Figure 3:
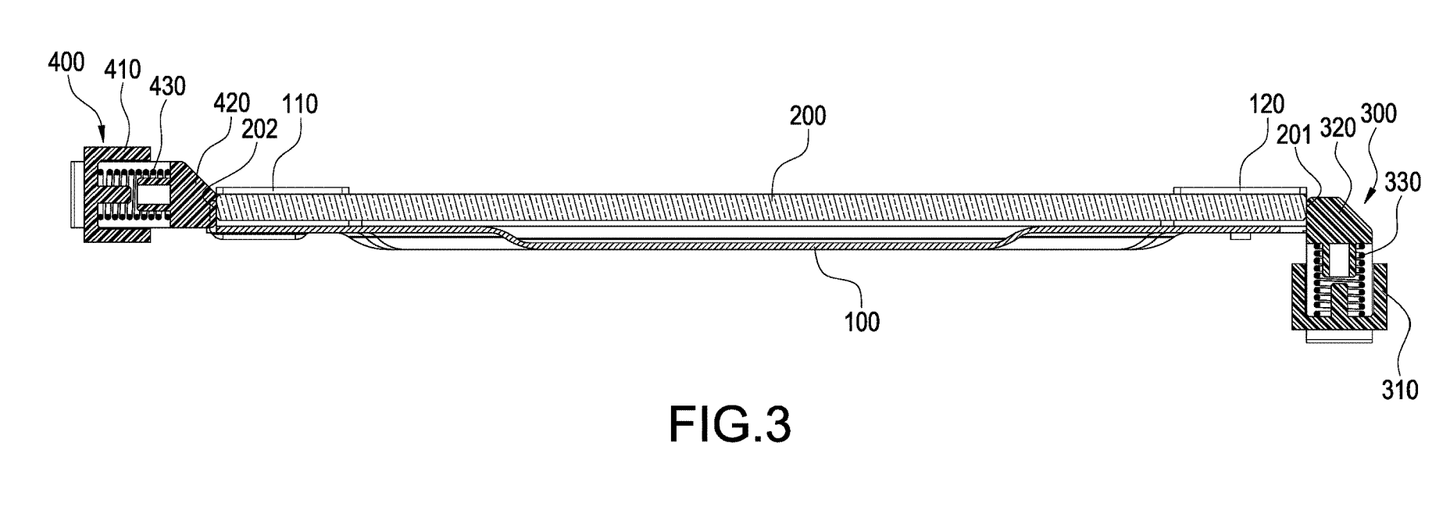
FIG. 3 is a cross sectional view showing the three-dimensional formation platform according to a preferred embodiment of the present invention.
Figure 4:
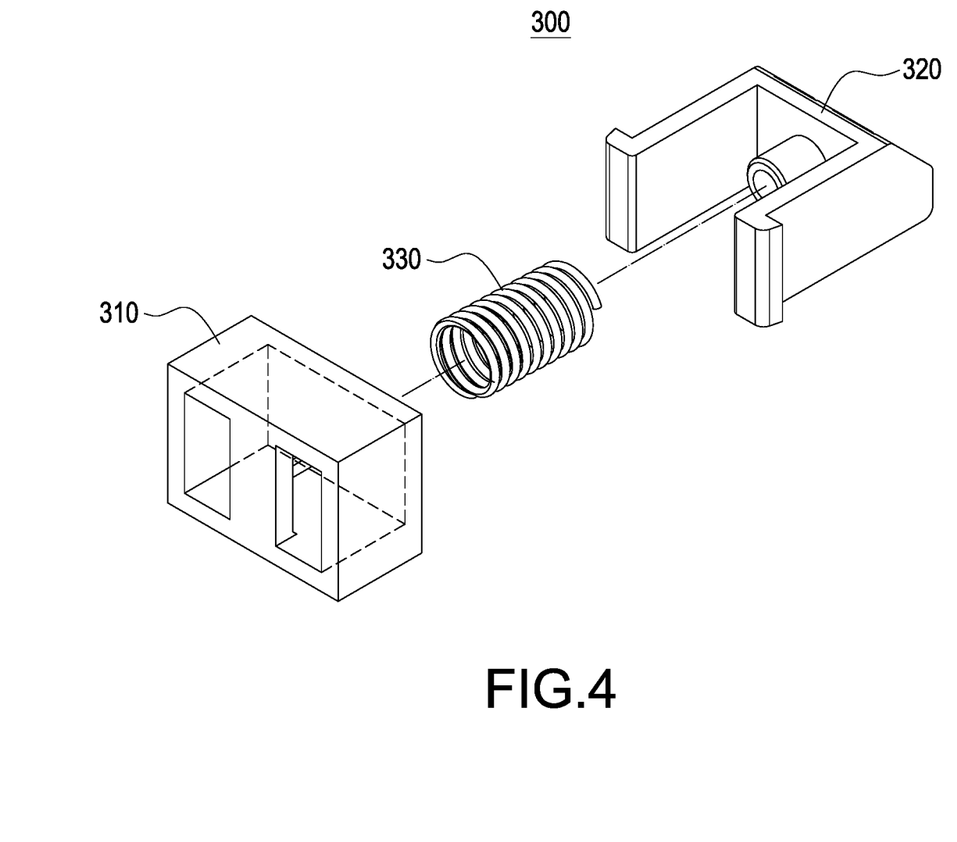
FIG. 4 is a perspective exploded view showing the elastic stopping unit of the three-dimensional formation platform according to a preferred embodiment of the present invention.

Please refer from FIG. 1 to FIG. 3, a three-dimensional formation platform comprising a base (100), a carrier (200), an elastic stopping unit (300) and an elastic pushing unit (400) is disclosed according to a preferred embodiment of the present invention.

According to this embodiment, the base (100) is preferably formed as a metal-made plate member, and the base (100) is used for being fastened on a device so as to allow the carrier (200) to be supported. According to this embodiment, the base (100) is preferably formed with penetrated holes for being locked on the device, and the base (100) is formed with a pair of guide slots (110) arranged in parallel and oppositely disposed, thereby allowing the carrier (200) to be inserted. The carrier (200) is stacked on the base (100) and clamped between the pair of guide slots (110). The elastic stopping unit (300) and the elastic pushing unit (400) are correspondingly disposed at two ends of the guide slot (110) for clamping the carrier (200).

Figure 5:
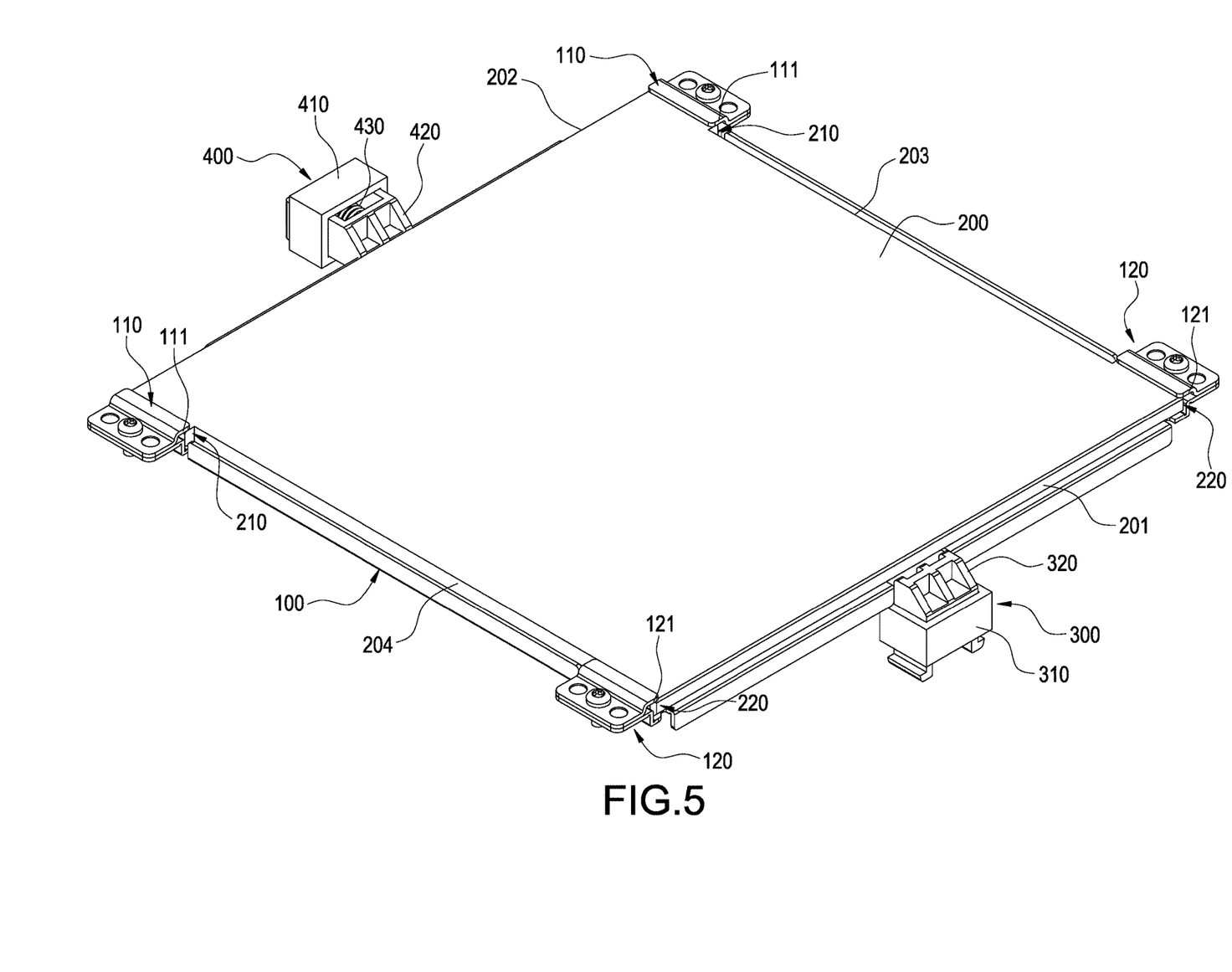
FIG. 5 is a schematic view showing an operating status of the three-dimensional formation platform according to a preferred embodiment of the present invention.
Figure 6:
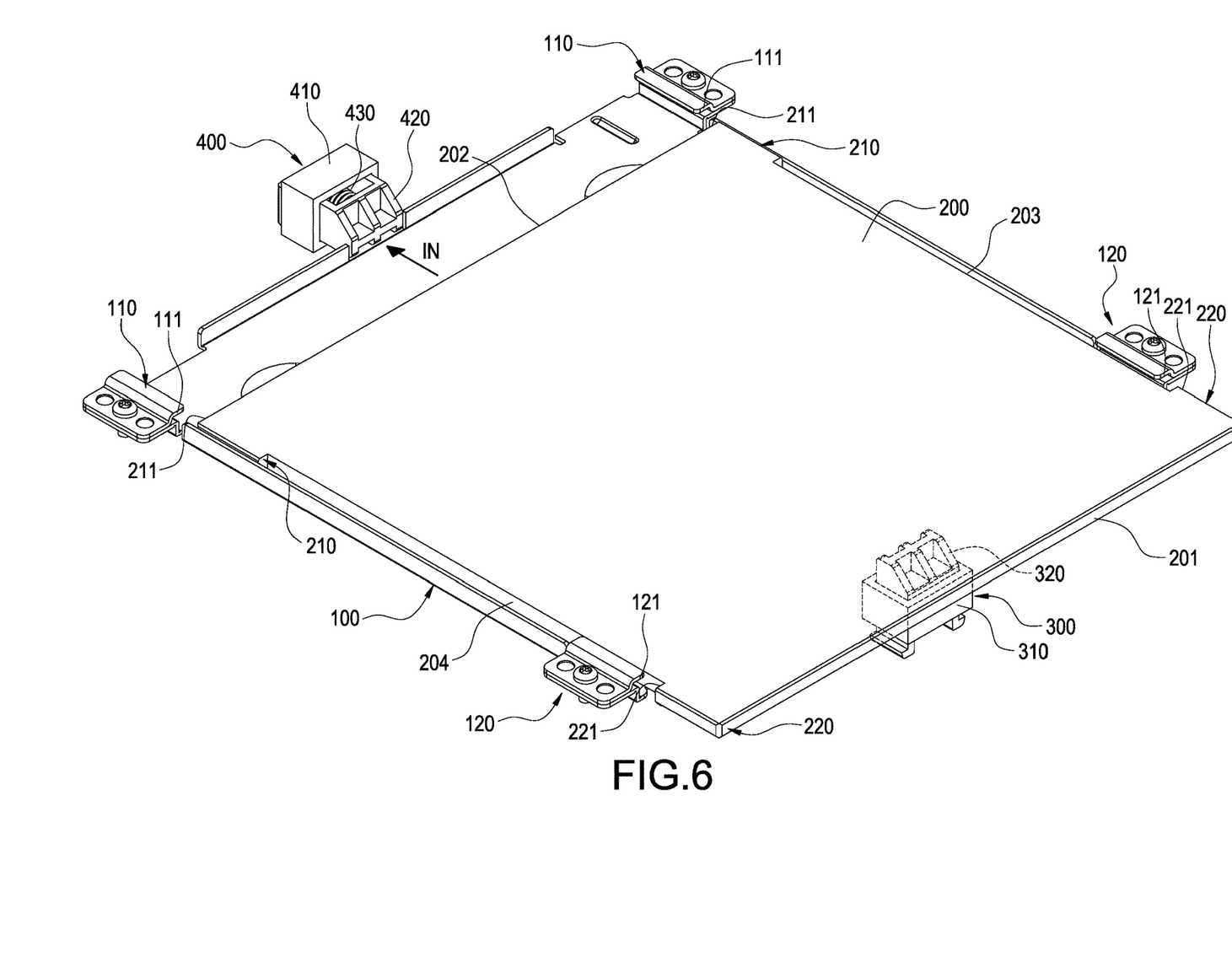
FIG. 6 is a schematic view showing another operating status of the three-dimensional formation platform according to a preferred embodiment of the present invention.
Figure 7:
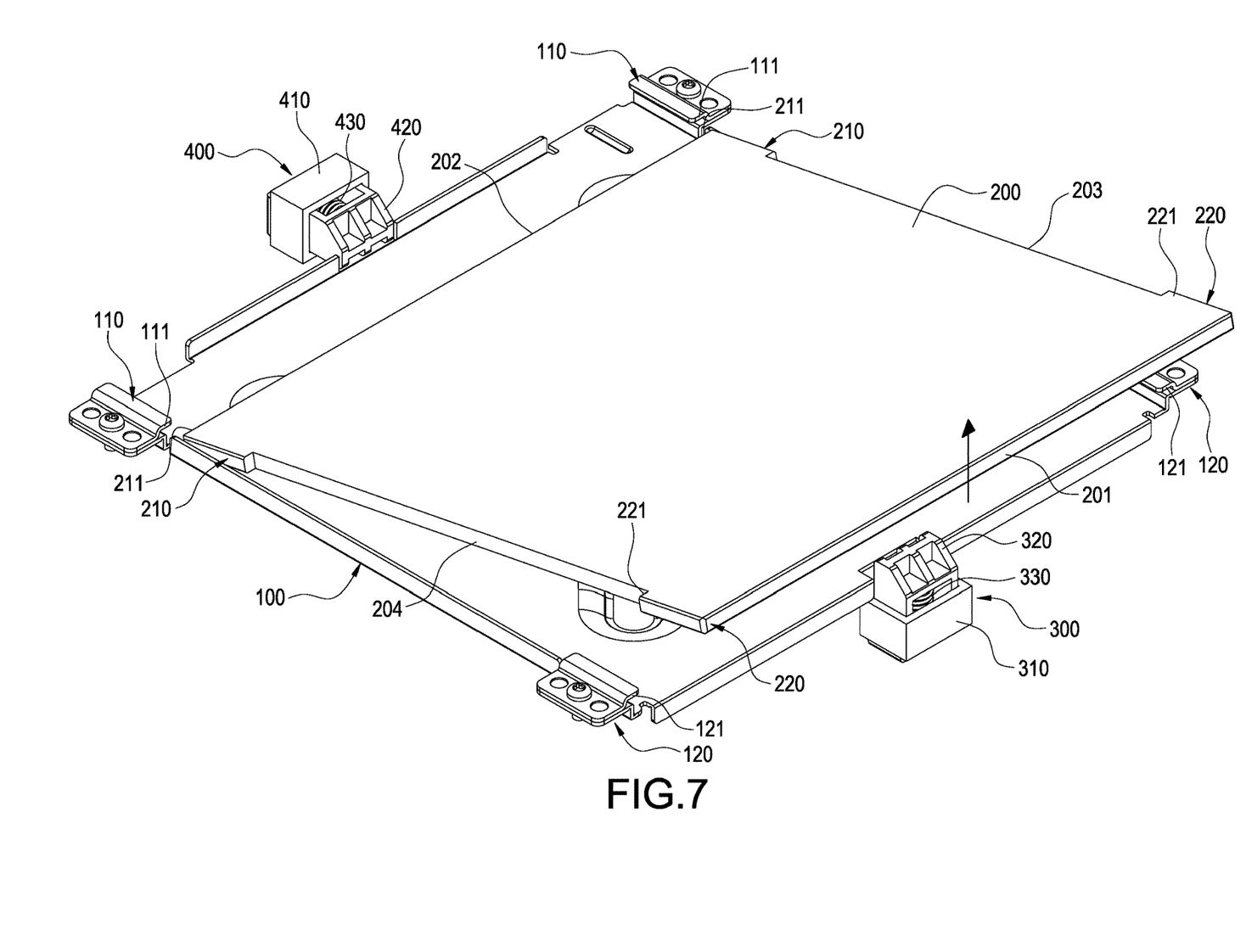
FIG. 7 is a schematic view showing one another operating status of the three-dimensional formation platform according to a preferred embodiment of the present invention.

Please refer from FIG. 5 to FIG. 7, the carrier (200) is installed on the base (100) along an installing direction (IN) parallel to the pair of guide slots (110), the installing direction (IN) is defined as from the elastic stopping unit (300) towards the elastic pushing unit (400). The elastic stopping unit (300) can be compressed for releasing the carrier (200), and the elastic pushing unit (400) is able to provide an elastic force towards the elastic stopping unit (300) along the longitudinal direction of the guide slot (110), so that the carrier (200) can be displaced in a direction opposite to the installing direction (IN) for being released from the guide slot (110). In addition, the elastic stopping unit (300) can be compressed for allowing the carrier (200) to pass for being inserted in the pair of guide slots (110).

As shown from FIG. 1 to FIG. 3, according to this embodiment, the carrier (200) is preferably formed as a rectangular plate member, four corners of the carrier (200) are respectively formed with a front edge (201), a rear edge (202) opposite to the front edge (201), and a pair of lateral edges (203, 204) arranged at opposite sides. The lateral edges (203, 204) are served to allow the corresponding guide slot (110) to be disposed thereon, and the elastic stopping unit (300) is abutted against the front edge (201) of the carrier (200) and the elastic pushing unit (400) is abutted against the rear edge (202) of the carrier (200), thereby enabling the carrier (200) to be clamped and fastened in the pair of the guide slots (110).

As shown from FIG. 5 to FIG. 7, according to this embodiment, a flange (210) is respectively extended from the lateral edges (203, 204) corresponding to the guide slot (110), and the flange (210) is received in the guide slot (100). One end of the guide slot (110) corresponding to the elastic stopping unit (300) is defined as an inlet end (111), one end of the flange (210) is defined as an entry end (211). When the flange (210) is about to be received in the corresponding guide slot (110), the entry end (211) is allowed to firstly pass the corresponding inlet end (111). When the carrier (200) is clamped between the elastic stopping unit (300) and the elastic pushing unit (400), a distance (D1) defined between the entry end (211) and the corresponding inlet end (111) is smaller than a distance defined between the elastic stopping unit (300) and the elastic pushing unit (400) along the installing direction (IN). As such, the carrier (200) is able to be disposed on the base (100) along a forward direction of the carrier (200), and the above-mentioned displacement is relatively easier than a displacement of transversally moving for being disposed in the guide slot (110). Moreover, the carrier (200) can be released from the guide slot (110) without a need of being transversally moved till fully removed from the base (100), so that the carrier (200) can be easily taken out. According to this embodiment, the distance (D1) defined between the entry end (211) and the corresponding inlet end (111) is smaller than half of the distance defined between the elastic stopping unit (300) and the elastic pushing unit (400) along the installing direction (IN). When the carrier (200) is desired to be released from the guide slot (110), the carrier (200) can still be supported by the base (100) thereby prevented from falling out.

Moreover, the base (100) is further formed with a secondary guide slot (120) corresponding to at least one of the guide slots (110) and allowing the carrier (200) to be received, the secondary guide slot (120) is arranged between the elastic stopping unit (300) and the corresponding guide slot (110) and the secondary guide slot (120) is longitudinally aligned with the corresponding guide slot (110). According to this embodiment, the base (100) is formed with the secondary guide slot (120) respectively corresponding to the guide slots (110), and the lateral edges (203, 204) of the carrier (200) are received in the corresponding secondary guide slots (120). Substantially speaking, a secondary flange (220) is extended from portions of the lateral edges (203, 204) of the carrier (200) corresponding to the secondary guide slot (120), and the secondary flange (220) is received in the corresponding secondary guide slot (120). One end of the secondary guide slot (120) corresponding to the elastic stopping unit (300) is defined as a secondary inlet end (121), one end of the secondary flange (220) is defined as a secondary entry end (221), when the secondary flange (220) is about to be received in the corresponding secondary guide slot (120), the secondary entry end (221) is allowed to firstly pass the secondary inlet end (121). When the carrier (200) is clamped between the elastic stopping unit (300) and the elastic pushing unit (400), a distance (D2) defined between the secondary entry end (221) and the corresponding secondary inlet end (121) is smaller than the distance (D1) defined between the entry end (211) and the inlet end (111), so that the secondary flange (220) is allowed to be firstly released from the corresponding secondary guide slot (120)

and then the flange (210) is released from the corresponding guide slot (110). After the secondary flange (220) is released from the secondary guide slot (120), the front edge (201) of the carrier (200) is abutted by the elastic stopping unit (300) for being lifted so as to allow the carrier (200) to be easily removed; at this moment, the carrier (200) is yet released from the guide slot (110), the rear edge (202) of the carrier (200) is still fastened between the pair of guide slots (110), so that the carrier (200) is prevented from falling out while being lifted by the elastic stopping unit (300).

Figure 8:
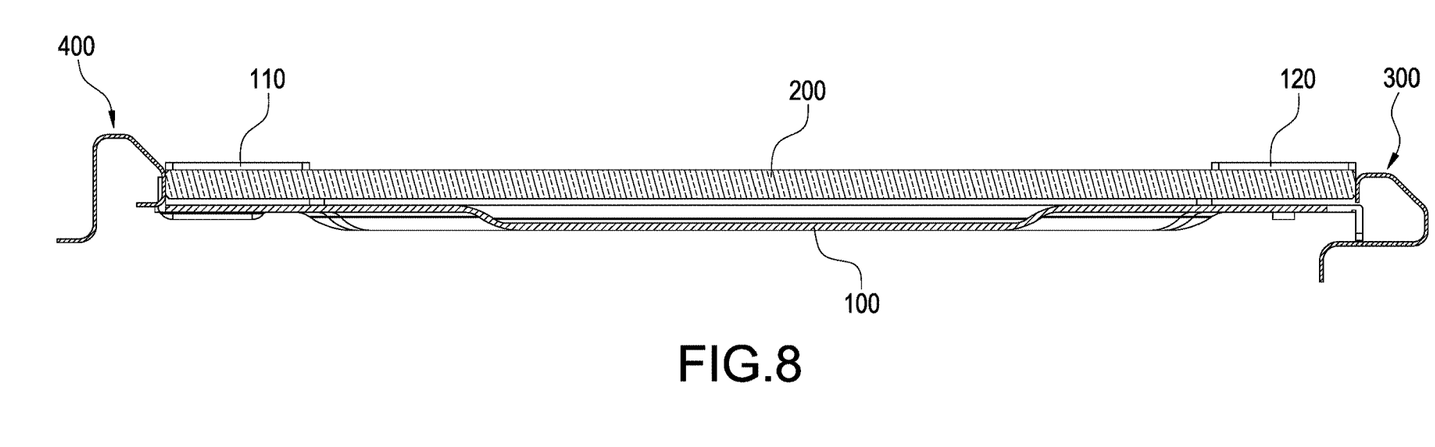
FIG. 8 is a schematic view showing a practice of the three-dimensional formation platform according to a preferred embodiment of the present invention.

Please refer to FIG. 8, the elastic stopping unit (300) of the three-dimensional formation platform provided by the present invention can be simply formed through a metal sheet being bent for forming as an elastic sheet, the elastic sheet can be used for stopping the carrier (200), the compressing direction of the elastic sheet is arranged to be vertical to the carrier (200), so when the elastic sheet is compressed, the carrier (200) is able to be moved into or released from the guide slot (110). As shown from FIG. 1 to FIG. 4, according to this embodiment, the elastic stopping unit (300) includes a seat part (310), a stopping block (320) moveably disposed on the seat part (310), and an elastic member (330) connected between the seat part (310) and the stopping block (320). The compressing direction of the elastic member (330) is arranged to be vertical to the carrier (200); according to this embodiment, the elastic member (330) is a columnar spring, but the above-mentioned elastic sheet can still be adopted. The seat part (310) is fixedly disposed on the base (100), the stopping block (320) is used for stopping the front edge (201) of the carrier (200), and the elastic member (330) can be compressed for allowing the stopping block (320) to move for releasing the carrier (200).

As shown in FIG. 8, the elastic pushing unit (400) can be simply formed through a metal sheet being bent for forming as an elastic sheet or a columnar spring (not show in figures) can be adopted as the elastic pushing unit (400). The compressing direction of the elastic pushing unit (400) is arranged to be parallel to the pair of guide slots (110) and the elastic pushing unit (400) is used for pushing the rear edge (202) of the carrier (200), so that the carrier (200) can be pushed for being displaced along the guide slot (110). As shown from FIG. 1 to FIG. 4, according to this embodiment, the configuration of the elastic pushing unit (400) is preferably the same as the configuration of the above-mentioned elastic stopping unit (300), and the elastic pushing unit (400) includes a seat part (410) fixedly disposed on the base (100), a pushing block (420) moveably disposed on the seat part (410), and an elastic member (430) connected between the seat part (410) and the pushing block (420), and the elastic member (430) can be a columnar spring or an elastic sheet. Wherein, the structure of the pushing block (420) is the same as that of the stopping block (320), but the compressing direction of the elastic member (430) of the elastic pushing unit (400) is parallel to the pair of guide slots (110).

Based on what has been disclosed above, the carrier (200), the elastic stopping unit (300), the elastic pushing unit (400) and the guide slots (110) of the three-dimensional printer provided by the present invention can work with each other for achieving an effect of being easily to be assembled/disassembled.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A three-dimensional formation platform, comprising:
   a base (100), formed with a pair of guide slots (110) arranged in parallel and oppositely disposed;
   a carrier (200), stacked on the base (100), clamped between the pair of guide slots (110) and installed on the base (100) along an installing direction (IN) parallel to the pair of guide slots (110);
   an elastic stopping unit (300); and
   an elastic pushing unit, (400), wherein the elastic pushing unit (400) and the elastic stopping unit (300) are correspondingly disposed at two ends of the pair of guide slots (110) and abutted against the carrier (200), thereby enabling the carrier (200) to be clamped and fastened in the pair of guide slots (110), and the installing direction (IN) is defined as from the elastic stopping unit (300) towards the elastic pushing unit (400);
   wherein, the elastic stopping unit (300) is able to be compressed for releasing the carrier (200), the elastic pushing unit (400) is able to provide an elastic force towards the elastic stopping unit (300), so that the carrier (200) is able to be displaced in a direction opposite to the installing direction (IN) for being released from the guide slot (110), a flange (210) corresponding to the guide slot (110) is extended from a portion defined at a lateral edge (203/204) of the carrier (200), and the flange (210) is received in the corresponding guide slot (110); one end of the guide slot (110) corresponding to the elastic stopping unit (300) is defined as an inlet end (111), and one end of the flange (210) is defined as an entry end (211), when the flange (210) is about to be received in the corresponding guide slot (110), the entry end (211) is allowed to firstly pass the corresponding inlet end (111), when the carrier (200) is clamped between the elastic stopping unit (300) and the elastic pushing unit (400), a distance (D1) defined between the entry end (211) and the corresponding inlet end (111) is smaller than a distance defined between the elastic stopping unit (300) and the elastic pushing unit (400) along the installing direction (IN), so that the carrier (200) is able to be disposed on or removed from the base (100) along a forward direction of the carrier (200).

2. The three-dimensional formation platform according to claim 1, wherein the distance (D1) defined between the entry end (211) and the corresponding inlet end (111) is smaller than half of the distance defined between the elastic stopping unit (300) and the elastic pushing unit (400) along the installing direction (IN).

3. The three-dimensional formation platform according to claim 1, wherein the base (100) is formed with a secondary guide slot (120) corresponding to the guide slot (110) and allowing the carrier (200) to be received, the secondary guide slot (120) is arranged between the elastic stopping unit (300) and the corresponding guide slot (110) and the secondary guide slot (120) is longitudinally aligned with the corresponding guide slot (110).

4. The three-dimensional formation platform according to claim 3, wherein a secondary flange (220) is extended from a portion defined at the lateral edge (203/204) of the carrier (200) corresponding to at least one of the secondary guide slots (120), and the secondary flange (220) is received in the corresponding secondary guide slot (120).

5. The three-dimensional formation platform according to claim 4, wherein one end of the secondary guide slot (120) corresponding to the elastic stopping unit (300) is defined as a secondary inlet end (121), one end of the secondary flange (220) is defined as a secondary entry end (221), when the secondary flange (220) is about to be received in the corresponding secondary guide slot (120), the secondary entry end (221) is allowed to firstly pass the secondary inlet end (121).

6. The three-dimensional formation platform according to claim 5, wherein when the carrier (200) is clamped between the elastic stopping unit (300) and the elastic pushing unit (400), a distance (D2) defined between the secondary entry end (221) and the corresponding secondary inlet end (121) is smaller than the distance (D1) defined between the entry end (211) and the inlet end (111), so that the secondary flange (220) is allowed to be firstly released from the corresponding secondary guide slot (120) and then the flange (210) is released from the corresponding guide slot (110).

7. The three-dimensional formation platform according to claim 1, wherein the elastic stopping unit (300) is an elastic sheet, and a compressing direction of the elastic stopping unit (300) is arranged to be vertical to the carrier (200).

8. The three-dimensional formation platform according to claim 1, wherein the elastic stopping unit (300) includes a seat part (310), a stopping block (320) moveably disposed on the seat part (310), and an elastic member (330) connected between the seat part (310) and the stopping block (320); a compressing direction of the elastic member (330) is arranged to be vertical to the carrier (200).

9. The three-dimensional formation platform according to claim 8, wherein the elastic member (330) is a columnar spring or an elastic sheet.

10. The three-dimensional formation platform according to claim 1, wherein the elastic pushing unit (400) is a columnar spring or an elastic sheet, and a compressing direction of the elastic pushing unit (400) is arranged to be parallel to the pair of guide slots (110).

11. The three-dimensional formation platform according to claim 1, wherein the elastic pushing unit (400) includes a seat part (410), a pushing block (420) moveably disposed on the seat part (410), and an elastic member (430) connected between the seat part (410) and the pushing block (420); and a compressing direction of the elastic pushing unit (400) is arranged to be parallel to the pair of guide slots (110).

12. The three-dimensional formation platform according to claim 11, wherein the elastic member (430) is a columnar spring or an elastic sheet.

\* \* \* \* \*